(12) United States Patent
Sugita et al.

(10) Patent No.: US 6,381,402 B1
(45) Date of Patent: *Apr. 30, 2002

(54) INFORMATION OUTPUT DEVICE, INFORMATION RECORDING DEVICE, INFORMATION DUPLICATION CONTROL SYSTEM AND RECORDING MEDIUM OF THE SAME

(75) Inventors: Takehiro Sugita, Kanagawa; Akira Ogino, Chiba; Takashi Usui, Tokyo, all of (JP)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/636,204

(22) Filed: Aug. 10, 2000

Related U.S. Application Data

(62) Division of application No. 08/968,119, filed on Nov. 12, 1997, now Pat. No. 6,112,008.

(30) Foreign Application Priority Data

Nov. 18, 1996 (JP) ............................................. 8-322330

(51) Int. Cl.[7] ................................................. H04N 5/91
(52) U.S. Cl. ........................... 386/94; 386/95; 380/203; 360/60
(58) Field of Search ...................... 386/94–96; 380/201, 380/203, 206; 360/60; 369/84; 375/140, 141; 705/57–58; 348/473, 461; H04N 5/91

(56) References Cited

U.S. PATENT DOCUMENTS

| | | | | |
|---|---|---|---|---|
| 3,984,624 A | * | 10/1976 | Waggener | 348/473 |
| 5,719,937 A | * | 2/1998 | Warren et al. | 380/203 |
| 5,963,909 A | * | 10/1999 | Warren et al. | 380/201 |
| 5,982,977 A | * | 11/1999 | Naruse et al. | 396/94 |
| 6,023,551 A | * | 2/2000 | Sugita et al. | 386/94 |
| 6,112,008 A | * | 8/2000 | Sugita et al. | 386/94 |

* cited by examiner

Primary Examiner—Vincent F. Boccio
(74) Attorney, Agent, or Firm—Jay H. Maioli

(57) ABSTRACT

The invention intends to secure the control of duplicating information signals. In the duplication control method according to the invention, a main information signal containing a duplication control information transformed into a spread spectrum signal to be superimposed and a duplication control information superimposed by a processing different from the spectrum spreading is transmitted. The duplication control information transformed into a spread spectrum signal is extracted from the main information signal by the reverse spectrum spreading, and the duplication control information superimposed by the different processing is extracted from the main information signal. One information most closest to duplication prohibition is selected as an output duplication control information out of the plural extracted duplication control information. On the basis of the selected output duplication control information, the main information signal is controlled on duplication.

34 Claims, 11 Drawing Sheets

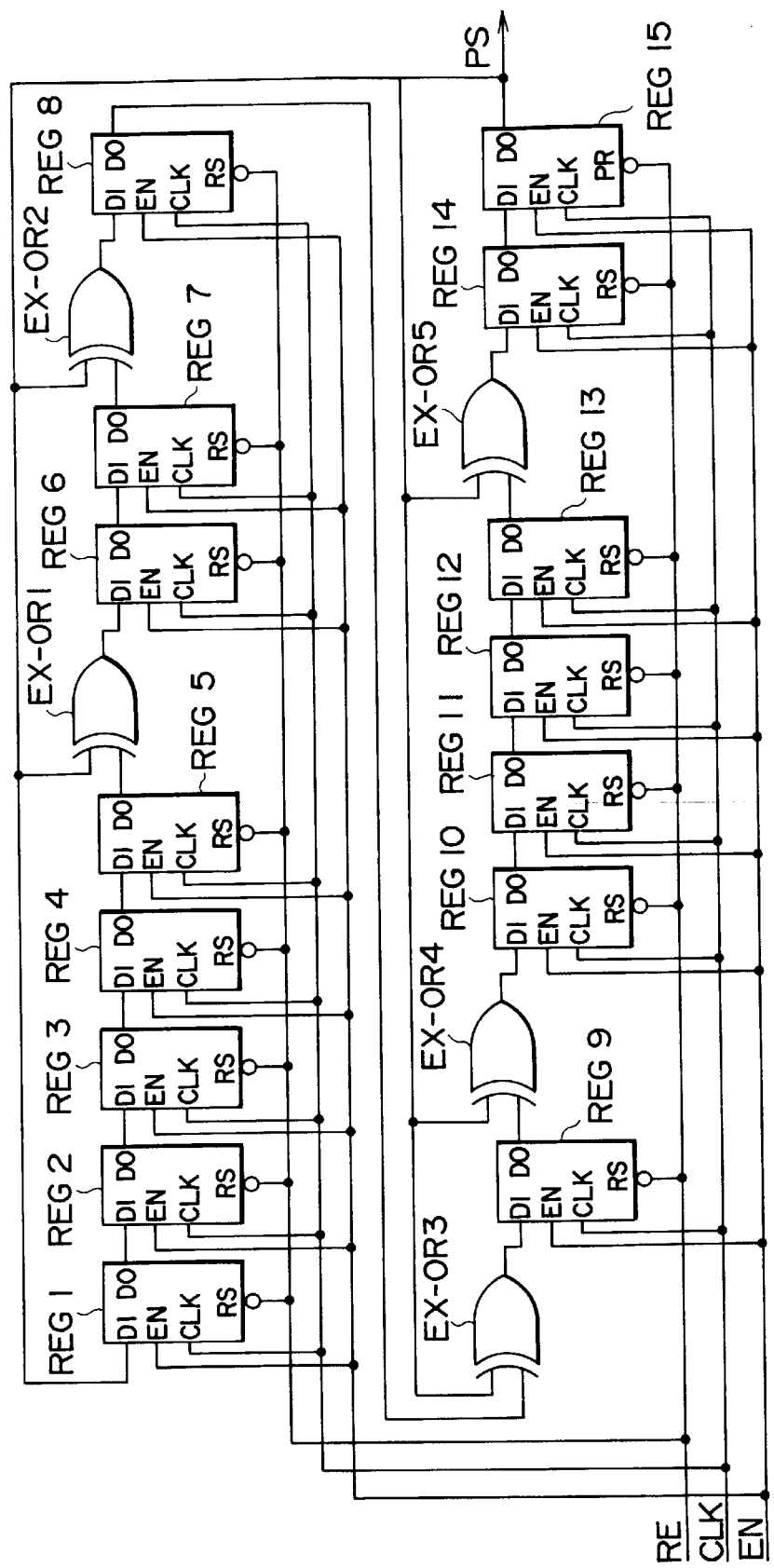
F I G. 5

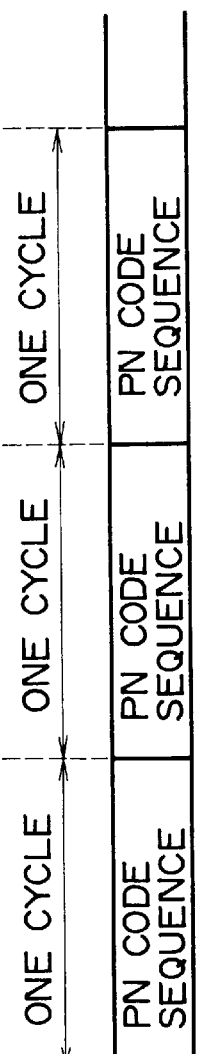
FIG. 6A VERTICAL SYNCHRONIZING SIGNAL VD
FIG. 6B RESET SIGNAL RE
FIG. 6C PN CODE SEQUENCE PS

DUPLICATION CONTROL SIGNAL
SPECTRUM BEFORE BEING SPREAD

DUPLICATION CONTROL SIGNAL
SPECTRUM AFTER BEING SPREAD

SPECTRUM OF VIDEO SIGNAL HAVING SS
DUPLICATION CONTROL SIGNAL SUPERIMPOSED ON

SIGNAL SPECTRUM AFTER REVERSE SPECTRUM
SPREADING APPLIED ON RECORDING DEVICE

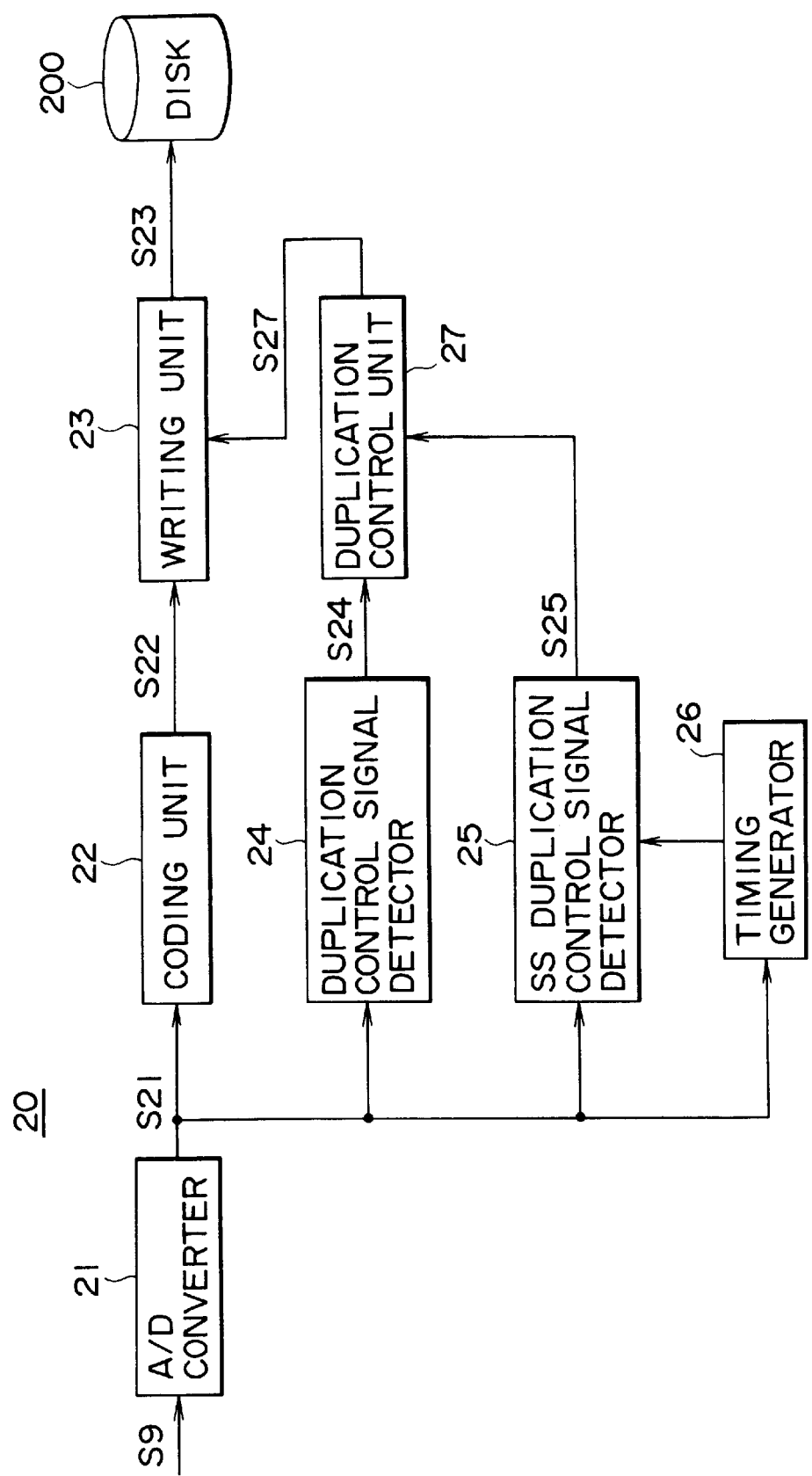

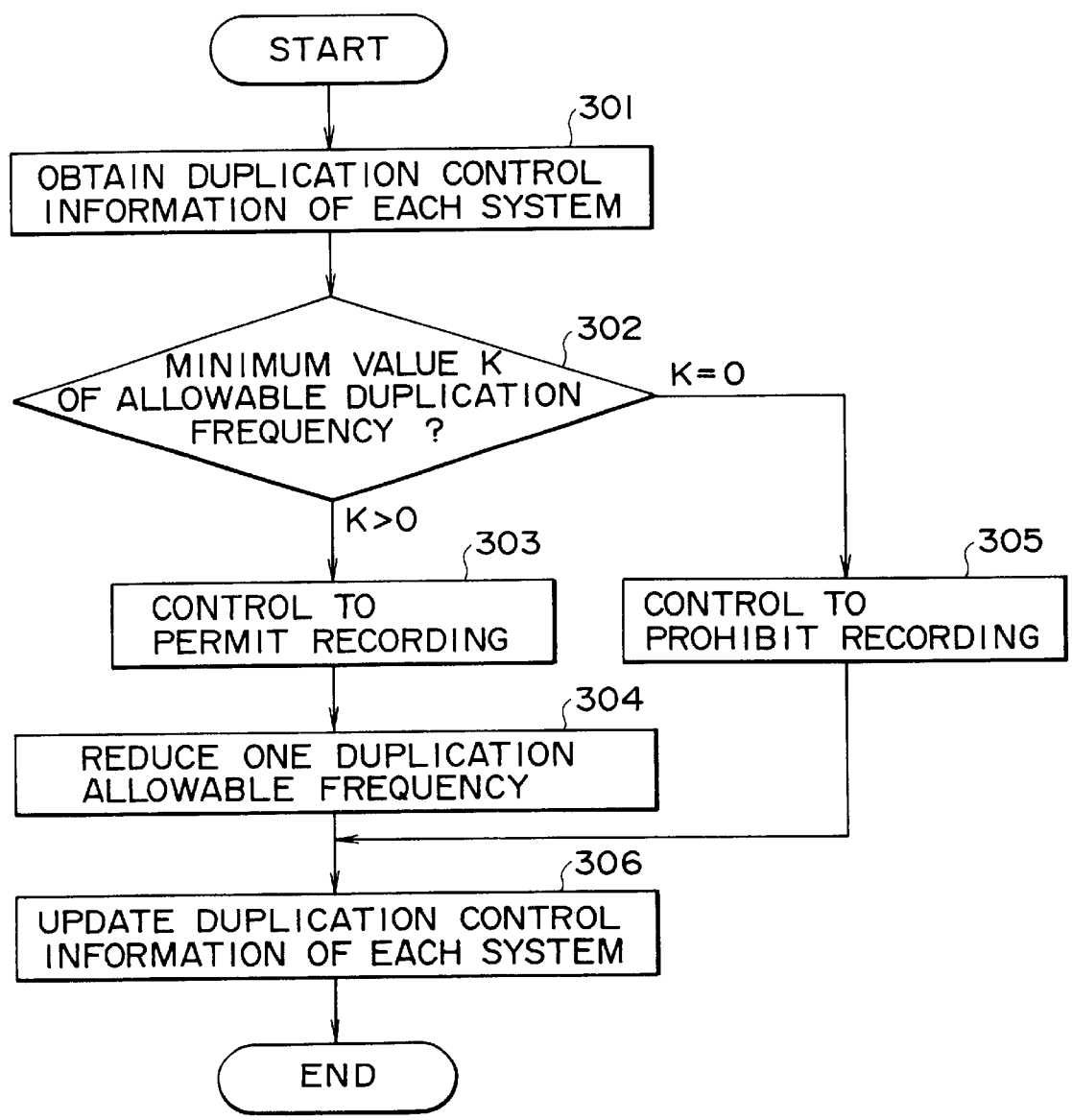

INFORMATION OUTPUT DEVICE, INFORMATION RECORDING DEVICE, INFORMATION DUPLICATION CONTROL SYSTEM AND RECORDING MEDIUM OF THE SAME

The present invention is a divisional of prior application Ser. No. 08/968,119 filed Nov. 12, 1997 now U.S. Pat. No. 6,112,008.

BACKGROUND OF THE INVENTION

1. Field of the Invention

The present invention relates to a method and device to limit or prohibit duplication of information such that, for example, an information signal recorded on a recording medium is reproduced and transmitted in the analog signal state with an information for preventing duplication, and the transmitted information signal is received and recorded on another recording medium; and an information output device to be used for the device.

2. Description of the Related Art

Video Tape Recorders (VTRs) have been widespread, and there have been provided great many software applications that VTRs can reproduce. In recent years, reproduction devices such as the digital VTR and DVD (digital video disk) have come into reality. Thereby, people are able to easily reproduce good pictures and sounds to watch and listen.

However, there has been a risk that software applications thus abundantly provided are to be duplicated unlimitedly, and various measures for preventing duplication have been adopted so far.

For example, there is a method for substantially preventing duplication by exploiting the difference in the AGC (auto gain control) system between a VTR as a recording device and a monitor receiver to provide pictures, or the difference in the APC (auto phase control) characteristic.

That is, the VTR applies, for example, an AC system that employs a pseudo synchronizing signal interpolated into the video signal, and the monitor receiver applies another AGC system that does not employ the pseudo synchronizing signal. The duplication prevention method that utilizes the difference in the AGC system interpolates an extremely high level of a pseudo synchronizing signal as a synchronizing signal for the AGC when recording analog video signals on an original recording medium, and interpolates the extremely high level of a pseudo synchronizing signal into the video signals supplied to a recording VTR from a reproducing VTR as a synchronizing signal for the AGC.

And, the VTR applies an APC system that employs the phase of the color burst signal itself of the video signal, and the monitor receiver applies another APC system. The duplication prevention method that utilizes the difference in the APC characteristic partially inverts the phase of the color burst signal of the video signal, and outputs the video signal partially inverted in the phase of the color burst signal as the video signal supplied to the recording VTR from the reproducing VTR, when recording analog video signals on an original recording medium.

With the system thus arranged, the monitor receiver that receives analog video signals from the reproducing VTR is able to reproduce a normal picture without being affected by the pseudo synchronizing signal or the partial phase inversion of the color burst signal used for the APC.

However, when the VTR receives analog video signals having the pseudo synchronizing signal interpolated or the analog signals having the phase of the color burst signal partially inverted from the reproducing VTR as in the foregoing, and records the analog video signals on a recording medium, the VTR cannot properly perform the gain control, or the phase control in accordance with the input signal; thus the VTR is not able to normally record the video signals. Accordingly, the VTR cannot present a normal picture good for watching and listening when reproducing the recorded video signal.

Such a manner to process analog video signals is not to prohibit duplication, but to lead a normal reproduced picture good for watching and listening not to be obtained, which is in a sense a passive control of preventing duplication.

On the other hand, in processing digitized data, for example, digitized video signals, a direct control of preventing duplication is adopted such that a duplication control signal made of a duplication prevention code, a generation limitation code of duplication, or the like is added on the video signal as a digital data and recorded on a recording medium to thereby prohibit duplication.

FIG. 1 is a basic block diagram of a reproducing and recording system to process the digitized data. A digital information signal reproduced by a digital reproducing device 110 is transmitted to a digital recording device 120 through a digital transmission line 101. The recording device performs duplication in case the digital information signal permits of duplication, and prohibits duplication in case the digital information signal does not permit of duplication.

On a recording medium 111 mounted on the digital reproducing device 110, a duplication control information as an added information is recorded in addition to a main digital information. The duplication control information indicates the contents of control such as duplication prohibition, duplication permission, generation limit of duplication. A digital reproducing unit 112 reads out an information signal from the recording medium 111, and acquires the duplication control information as well as the main digital information, which are transmitted to the digital recording device 120 through the digital transmission line 101.

A duplication control signal detection unit 122 of the digital recording device 120 detects a duplication control signal from an information signal received through the digital transmission line 101, and discriminates the contents of control. And, the detection unit 122 transmits the discrimination result to a digital recording unit 121.

When the discrimination result of the duplication control signal from the duplication control signal detection unit 122 indicates permission to record the digital information inputted through the digital transmission line 101, the digital recording unit 121 converts the foregoing inputted digital signal into a digital information suitable for recording, and writes it on a recording medium 123. On the other hand, when the discrimination result of the duplication control signal from the duplication control signal detection unit 122 indicates prohibition to duplicate, the digital recording unit 121 is designed not to record the foregoing inputted digital information.

Further, when the discrimination result of the duplication control signal from the duplication control signal detection unit 122 indicates permission to duplicate only for the first generation, the digital recording unit 121 converts the foregoing inputted digital signal into a digital information suitable for recording, and writes it on the recording medium 123, and at the same time, changes the duplication control signal as an added information into a signal to indicate duplication prohibition (duplication prohibition for the next generation), and records the signal on the recording medium 123. Accordingly, it becomes impossible to duplicate video signals using the duplicated recording medium 123.

Thus, in case of the so-called digital connection such that the main information signal and the duplication control signal as an added information are supplied to the recording device as a digital signal, using the duplication control signal can secure the duplication control such as duplication prohibition in the recording device.

Incidentally, if the digital reproducing device in FIG. 1 is a digital VTR, for example, in order to monitor reproduced video signals and audio signals, only the video signals and audio signals being main information signals are converted into analog signals through a D/A converter 113, which are usually supplied to a monitor receiver through an analog output terminal 114.

In this manner, although the reproducing device is for digital information, the analog signal supplied from the analog output terminal 114 does not contain the duplication control signal. Accordingly, if an analog VTR is connected to the analog output terminal 114, duplication of information signals becomes possible.

Accordingly, it is suggested to superimpose the duplication control signal on the D/A converted video signals and audio signals. However, it is difficult to superimpose the duplication control signal without deteriorating the D/A converted video signals and audio signals, and to take out the duplication control signal in the recording device to utilize it for duplication prevention control.

Therefore, in the analog connection, there has been only the passive method for preventing duplication that utilizes the difference in the AGC system between the foregoing VTR and the monitor receiver or the difference in the APC characteristic therebetween.

Incidentally, in the control method for preventing duplication that utilizes the difference in the AGC system between the foregoing VTR and the monitor receiver or the difference in the APC characteristic therebetween, there is a case that video signals can be recorded unexpectedly normally depending on the AGC system or the APC characteristic of the recording device and even the passive duplication prevention cannot be carried out. Further, there has been a problem that disturbances can be generated on the reproduced picture on the monitor receiver.

In order to solve the foregoing problems, as an effective duplication control method that can be applied to either of the analog connection and the digital connection, without deteriorating reproduced picture and audio signals, the applicant has proposed a digital recording method and analog recording method of video signals in which the spectrum of a duplication control signal is spread, the spread spectrum duplication control signal is superimposed on the video signals in the analog signal state (refer to Japanese Patent Application Laid-Open No. Hei 7-339959).

In this method, a PN (Pseudo random Noise) sequence code (hereunder, referred to as PN code) used as a spectrum spreading code is generated in a sufficiently fast rate, and the duplication control signal is multiplied by the PN code to thereby spread the spectrum of duplication control signal. As the result, a narrow band and high level duplication control signal is transformed into a wide band and low level signal that does not affect the video signals and audio signals. And, the spread spectrum duplication control signal is superimposed on the analog video signals to be recorded on a recording medium. In this case, it is possible to record either of the analog and digital video signals on a recording medium.

In this method, since the duplication control signal is superimposed on the video signals, as a spread spectrum, wide band and low level signal, it is difficult for a person to make an illegal duplication to remove the duplication control signal from the video signals containing the duplication control signal.

However, it is possible to extract the duplication control signal from the video signals containing the duplication control signal by applying a reverse spectrum spreading processing to the duplication control signal. Therefore, the duplication control signal as well as the video signals can reliably be provided to the recording device, and at the same time the duplication control signal can be extracted on the side of the recording device and the duplication control can reliably be carried-out in accordance with the extracted duplication control signal.

As described above, it is difficult to remove the duplication control signal that has been transformed into a spread spectrum signal and superimposed on the video signals from the mixture of both, which, however, is theoretically possible.

For example, when the spread spectrum duplication control signal bears a constant level, a possible method receives the video signals containing the foregoing duplication control signal before supplying the video signals to the recording device, and detects the spread spectrum duplication control signal that is superimposed on the video signals. Further, the method generates a canceling signal having the same level and same phase as the spread spectrum duplication control signal superimposed on the video signals on the basis of the detected duplication control signal, and subtracts the canceling signal from the video signals on which the spread spectrum duplication control signal is superimposed. Thereby, it is possible to wipe out the spread spectrum duplication control signal superimposed on the video signals.

Thus, the duplication control signal superimposed on the video signals is removed, and accordingly, duplication of the video signals, which is prohibited, will become possible. This incurs a risk that allows the illegal duplication of video signals.

Further, when a duplication control signal as well as video signals is recorded on a recording medium, the duplication prevention control in the foregoing analog connection is difficult as described above.

SUMMARY OF THE INVENTION

The present invention has been made in view of the foregoing problems, and an object of the present invention is to provide a device, method, and recording medium that are able to improve the foregoing problems.

In order to accomplish the foregoing object, an information output device according to the invention is provided with: first duplication control information superimposing means that applies a spectrum spreading processing to a duplication control information signal generated on the basis of an added information obtained from a recording medium, indicating an allowable frequency of a main information signal being recorded on the recording medium to thereby generate a first duplication control information signal, and superimposes said first processed duplication control information signal on the main information signal read out from the recording medium; second duplication control information superimposing means that applies a processing different from a processing by the first duplication control information superimposing means to the basic duplication control information signal to thereby generate a second processed duplication control information signal, and superimposes said second processed duplication control information signal on the main information signal; and output means for outputting the main information signal containing the first and second processed duplication control information signals.

According to the foregoing information output device, even if the recording medium does not contain a spread spectrum duplication control information, when the information output device reads out the foregoing main information from the recording medium and generates a transmission signal to a recording device, the spread spectrum duplication control information is superimposed on an analog information signal; and therefore, the duplication prevention control can be performed effectively even in the analog connection.

Moreover, if the spread spectrum duplication control information is wiped off before being inputted to the recording device, there lies a duplication control information superimposed by a different processing, and the duplication prevention control on recording can be done by means of the duplication control information.

When there are plural kinds of duplication control information in this manner, inconsistency in the contents that these duplication control information indicate will present a problem.

Coping with this problem, an information recording device according to the invention is to receive an input signal generated in such a manner that a first processed duplication control information signal generated by a spectrum spreading processing being applied to a duplication control information signal indicating an allowable frequency of a main information signal being recorded on a recording medium is superimposed on the main information signal, and a second processed duplication control information signal generated by a processing different from the spectrum spreading processing being applied to the duplication control information signal is superimposed on the main information signal, and to record the main information signal on the recording medium. And, the information recording device is provided with: first duplication control information signal detecting means for applying a reverse spectrum spreading processing to said input signal and detecting the duplication control information signal based on the first processed duplication control information signal; second duplication control information signal detecting means for detecting from the input signal the duplication control information signal based on the second processed duplication control information signal superimposed by the processing different from the spectrum spreading processing; selection means for selecting, as an output duplication control information signal, a duplication control information signal that is the closest to duplication prohibition out of the first and the second duplication control information signals obtained by the first and second duplication control information detecting means; and recording control means for controlling to record the main information signal on the recording medium, on the basis of said output duplication control information signal selected by said selection means.

In this manner, the information recording device according to the invention regulates the inconsistency between the plural duplication control information by selecting the information that is the closest to duplication prohibition as an output duplication control information. Therefore, even if any of the duplication control information is modified before being inputted to the recording device and inconsistency occurs between plural duplication control information which are to be originally identical, a proper duplication prevention control can be carried out.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 5 is a block diagram for explaining one example of a part of a PN code sequence generator in FIG. 4;

FIGS. 6A to 6C illustrate a timing chart for explaining the embodiment in FIG. 2;

FIG. 8 is a block diagram for explaining one embodiment of a recording device according to the present invention;

FIG. 9 is a flow chart for explaining the operation of a major part of the one embodiment of the recording device according to the present invention;

DESCRIPTION OF THE PREFERRED EMBODIMENT

Preferred embodiments will hereafter be described with reference to the accompanying drawings.

An information duplication control method according to the invention is applied to an information duplication prevention system formed of an information output device and a recording device in the embodiment described hereafter. And, in the embodiment described hereafter, the information output device and the recording device will be described assuming that both are applied to the recording reproducing device (hereunder, referred to as DVD device) for a DVD (Digital Video Disk). The description on the audio signal system will be omitted here to be simple.

[First Embodiment]

Digitized video signals, audio signals, and only one kind of duplication control signal as an added information are recorded on a disk being a recording medium. The duplication control signal may be recorded on the innermost track area of the disk called as TOC (Table of Contents) or directory, or it may be recorded on the track where picture data and audio data are recorded, on a recording area different form the recording area for these data. The latter case will now be described, in which reading out the picture data accompanies reading out the duplication control signal.

Figure 1:
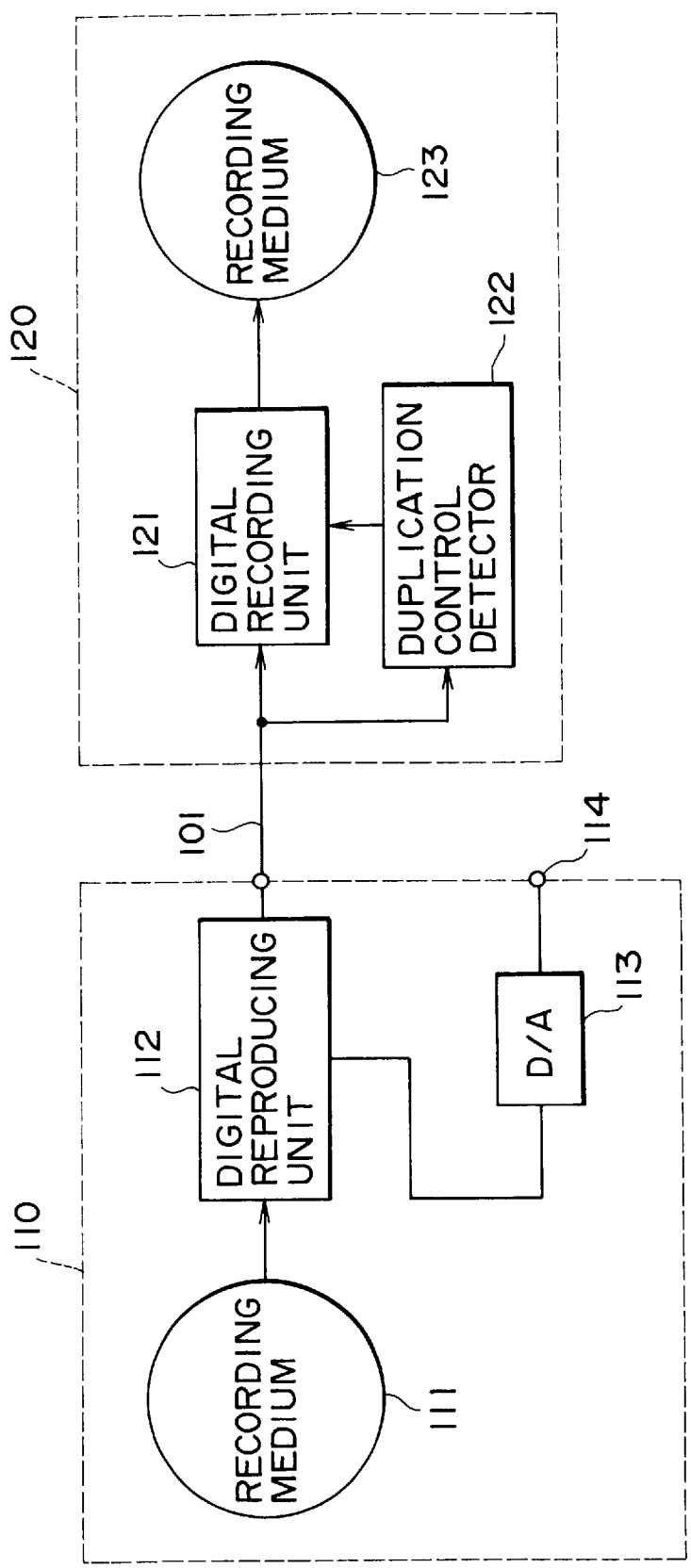
FIG. 1 is a block diagram for explaining a conventional construction of the duplication control system.
Figure 2:
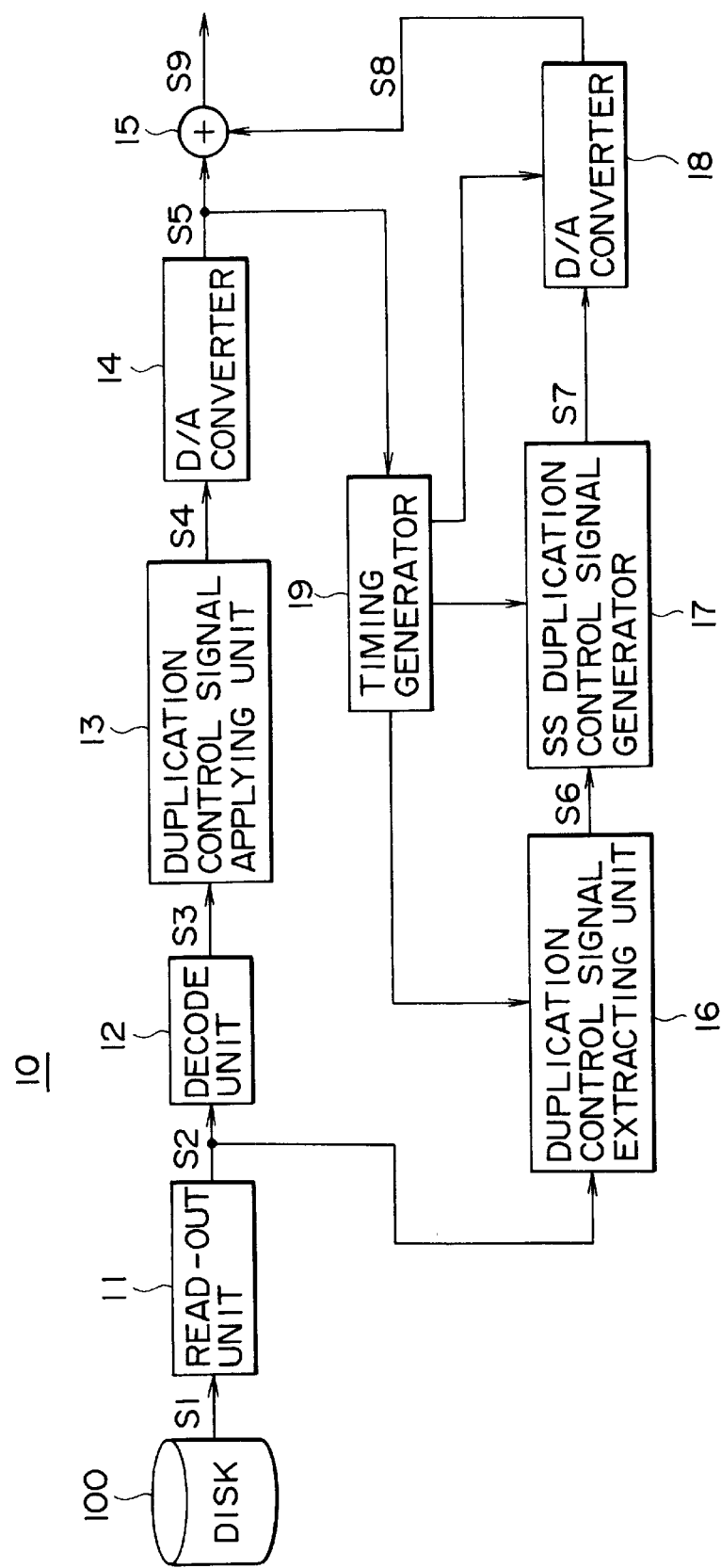
FIG. 2 is a block diagram for explaining one embodiment of an information output device according to the present invention.

In the analog connection such that the foregoing recording medium is reproduced and the reproduced signals are converted into analog signals to be supplied to the recording device, the information output device as shown in FIG. 2 is used as a device to reproduce a DVD.

FIG. 2 is a block diagram for explaining an information output device 10. The information output device 10 corresponds to the reproduction system of the DVD device. The duplication control signal is an information to indicate the allowable frequency to which a video signal can be duplicated. The allowable frequency 0 indicates the prohibition of duplication. The duplication control signal is interpolated into the picture data as described above. A disk 100 is loaded into the information output device 10, and a recorded signal is read out in accordance with a request for a read-out.

As shown in FIG. 2, The information output device 10 is provided with a read-out unit 11, decode unit 12, duplication control signal applying unit 13, D/A converter 14, adder 15, duplication control signal extracting unit 16, SS duplication control signal generator 17 (SS indicates the abbreviation of spread spectrum), D/A converter 18, and timing generator 19. The read-out unit 11 reads out digital components S2 of the reproduced video signals from a signal S1 obtained by reproducing information recorded in the disk 100, and supplies the digital components S2 to the decode unit 12 and the duplication control signal extracting unit 16.

The decode unit 12 decodes the digital components S2 of the reproduced video signals and the duplication control signal contained in the picture data, and supplies a decoded signal S3 to the duplication control signal applying unit 13. This duplication control signal applying unit 13 applies the concerned duplication control signal onto the video signals so that the duplication control signal is superimposed on the video signals after being converted into analog signals. In this example, the duplication control signal being a digital signal is superimposed in the vertical blanking period of the video signals, before the D/A conversion.

A signal S4 from the duplication control signal applying unit 13 is supplied to the D/A converter 14, and an analog video signal S5 including the vertical synchronizing signal and horizontal synchronizing signal is obtained from the D/A converter 14. The analog video signal S5 is supplied to the adder 15 and the timing generator 19.

The timing generator 19 receives the analog video signal S5 from the D/A converter 14, employs the picture synchronizing signal of the analog video signal S5 as a reference signal, and generates clock signals and various timing signals.

Figure 3:
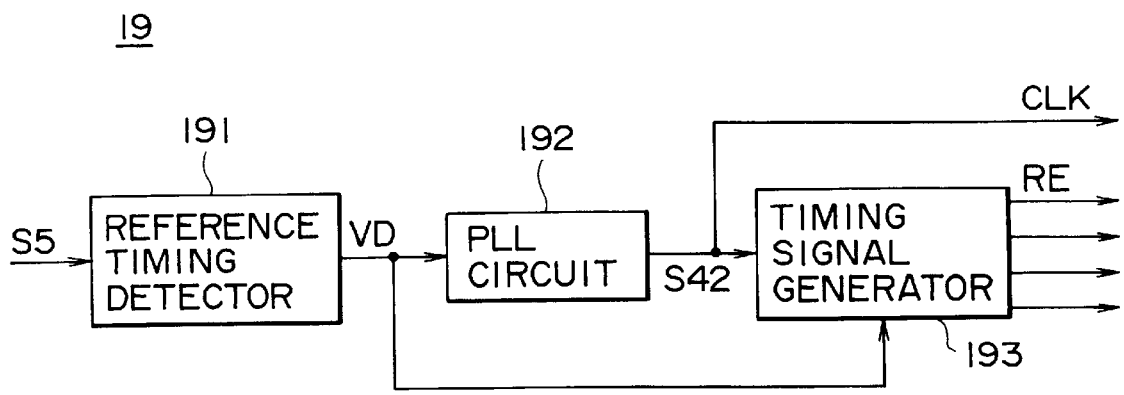
FIG. 3 is a block diagram for explaining a part of the information output device in FIG. 2.

FIG. 3 is a block diagram showing a detailed construction of the timing generator 19. As shown in FIG. 2, the timing generator 19 contains a reference timing detector 191, PLL circuit 192, and timing signal generator 193.

The reference timing detector 191 extracts the picture synchronizing signal as the reference timing signal from the analog video signal S5 supplied from the D/A converter 33. In this embodiment, a vertical synchronizing signal VD is employed as the reference timing signal. Accordingly, the reference timing detector 191 extracts the vertical synchronizing signal VD, and supplies the signal VD to the PLL circuit 192 and the timing signal generator 193.

The PLL circuit 192 generates a clock signal CLK synchronized with the vertical synchronizing signal VD. The clock signal CLK is supplied to the timing signal generator 193, and at the same time the duplication control signal extracting unit 16, SS duplication control signal generator 17, D/A converter 18, etc.

The timing signal generator 193 generates a reset signal (initializing signal) RE for a PN code generator 172 described later and the other various timing signals on the basis of the vertical synchronizing signal VD and the clock signal CLK. The reset signal RE is generated as a signal using one vertical period as one cycle, to synchronize with the vertical synchronizing signal VD.

The duplication control signal extracting unit 16 extracts a duplication control signal S6 from an information data sequence of the reproduced video signal components S2, and supplies the duplication control signal S6 to the SS duplication control signal generator 17.

The SS duplication control signal generator 17 generates the PN (Pseudo random Noise) code sequence, and transforms the duplication control signal S6 into a spread spectrum signal by using the PN code sequence.

Figure 4:
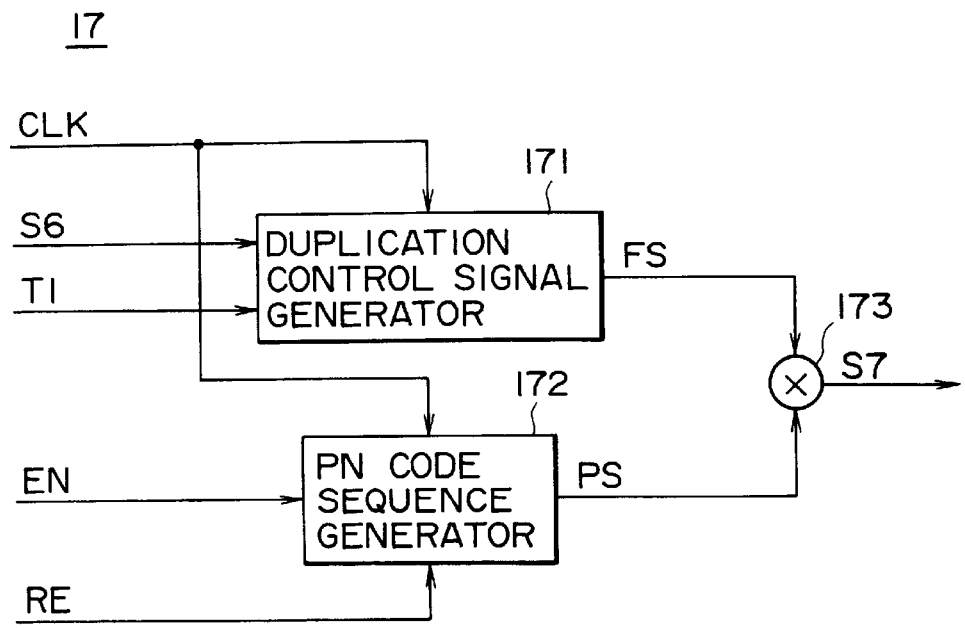
FIG. 4 is a block diagram for explaining a part of the information output device in FIG. 2.

FIG. 4 is a chart showing a construction of the SS control signal generator 17. The SS control signal generator 17 contains a duplication control signal sequence generator 171, PN code sequence generator 172, and multiplier 173.

The duplication control signal sequence generator 171 is supplied with the clock signal CLK from the timing generator 19, the duplication control signal S6 from the duplication control signal extracting unit 16, and a timing signal T1. In this case, the timing signal T1 indicates the breakpoint timing of the duplication control signal S6 for each one bit.

And, the duplication control signal sequence generator 171 outputs the duplication control signal S6 for predetermined clocks for each one bit, thereby produces a duplication control signal sequence FS to supply the duplication control signal sequence FS to the multiplier 173. In this case, the duplication control signal sequence FS is generated to accompany a low bit data for indicating the allowable duplication frequency, for example, for each one vertical period.

The PN code sequence generator 172 is supplied with the clock signal CLK synchronized with the vertical synchronizing signal of the video signals from the timing generator 19 and the reset signal (initializing signal) RE. An Enable signal EN is a signal for putting the PN code sequence generator 172 into the operational state. In this embodiment, the Enable signal EN is generated by the information output device 10 being powered, and is supplied to the PN code sequence generator 172. The reset signal RE is a signal that makes the PN code sequence generator 172 generate the PN code sequence having a predetermined code pattern from the top of the sequence.

The PN code sequence generator 172 is brought into the operational state in accordance with the Enable signal EN. And, the PN code sequence generator 172 generates the PN code sequence from the top thereof at each timing that the reset signal RE is supplied, to synchronize with the clock signal CLK. The PN code sequence PS thus generated is supplied to the multiplier 173.

FIG. 5 is a chart showing a construction of the PN code sequence generator 172. The PN code sequence generator 172 in this example is formed of 15 D flip flops, REG 1 to REG 15, constituting a 15 stage shift register and exclusive OR circuits, EX-OR1 to EX-OR5, that operate appropriate tap outputs of this shift register. And, the PN code sequence generator 172 shown in FIG. 3 generates a PN code sequence PS of the M sequence on the basis of the reset signal RE, clock signal CLK, and Enable signal EN.

The multiplier 173 of the SS duplication control signal generator 17 transforms the duplication control signal sequence FS into a spread spectrum signal by using the PN code sequence PS from the PN code sequence generator 172. From the multiplier 173, a spread spectrum signal (hereunder, referred to as SS duplication control signal) S7 is obtained, which is the duplication control signal having the spectrum spread.

As described above, the SS duplication control signal generator 17 in the first embodiment is supplied with the clock signal CLK synchronized with the picture synchronizing signal from the timing generator 19, and at the same time the reset signal RE of the vertical period synchronized with the vertical synchronizing signal VD. Therefore, the SS duplication control signal S7 from the SS duplication control signal generator 17 is obtained, in which the spectrum of the duplication control signal is spread by the PN code sequence repetitively reset for each one vertical period.

In other words, as shown in FIGS. 6A to 6C, the SS duplication control signal generator 17 initializes the PN code sequence generator for each one vertical period by means of the reset signal RE (FIG. 6B) using one vertical period as one cycle, synchronized with the vertical synchronizing signal VD (FIG. 6A), and generates the PN code sequence PS. (FIG. 6C) using one vertical period as a repetitive period to synchronize with the clock signal CLK. And, the SS control signal generator 17 transforms the duplication control signal S6 into a spread spectrum signal by using the PN code sequence PS, thus producing the SS duplication control signal S7.

The SS duplication control signal S7 thus obtained from the SS duplication control signal generator 17 is supplied to the D/A converter 18, where the SS duplication control signal S7 is converted into an analog SS duplication control signal S8, which is supplied to the adder 15.

The adder 15 receives the analog video signal S5 from the D/A converter 14 and the analog SS duplication control signal S8 from the D/A converter 18, produces an analog video signal S9 on which the analog SS duplication control signal S8 is superimposed, and outputs the analog video signal S9. And, the analog video signal S9 on which the analog SS duplication control signal S8 is superimposed is supplied to the monitor receiver to display picture images and the recording device to record the video signals on the recording medium.

Figure 7A:
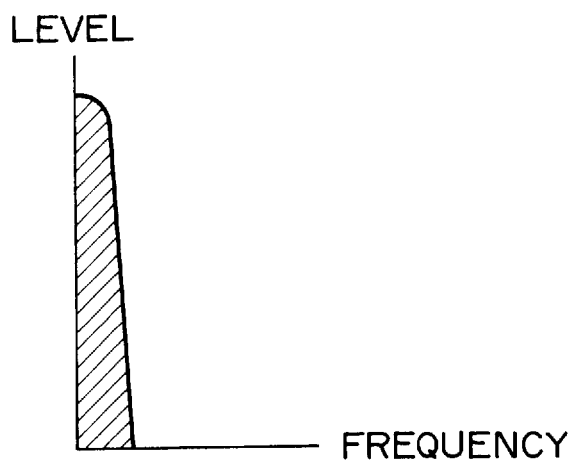
FIG. 7 illustrates the relation between a SS duplication control signal and an information signal by means of spectrum.
Figure 7B:
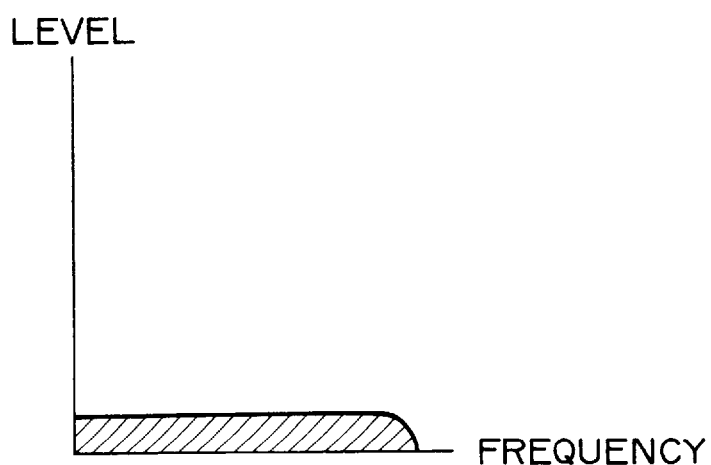

FIGS. 7A to 7D illustrate a relation between the duplication control signal and the main information signal (video signal in this example) in spectrum. The duplication control signal contains a low information, and is a signal of low bit rate, a narrow band signal as shown in FIG. 7A. Applying the spectrum spreading to this signal will produce a wide band signal as shown in FIG. 7B. Here, the level of the spread spectrum signal goes low inversely proportionally to the expansion rate of the band.

Figure 7C:
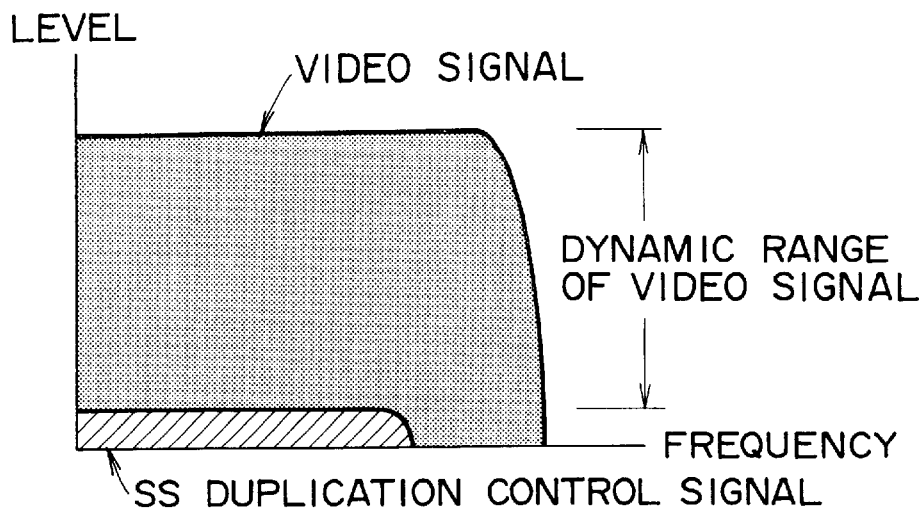

This spread spectrum signal, namely, the SS duplication control signal S6 is superimposed on the information signal by the adder 15. In this case, as shown in FIG. 7C, the SS duplication control signal S6 is made sufficiently lower in level than the maximum level of the video signal, namely, the main information signal, before being superimposed. As the superimposition is made in this manner, the main information signal will not substantially be deteriorated. Accordingly, when the video signals on which the SS duplication control signal is superimposed is supplied to the monitor receiver to reproduce picture images, a reproduced picture is not substantially affected by the SS duplication control signal, presenting a good reproduced picture.

Figure 7D:
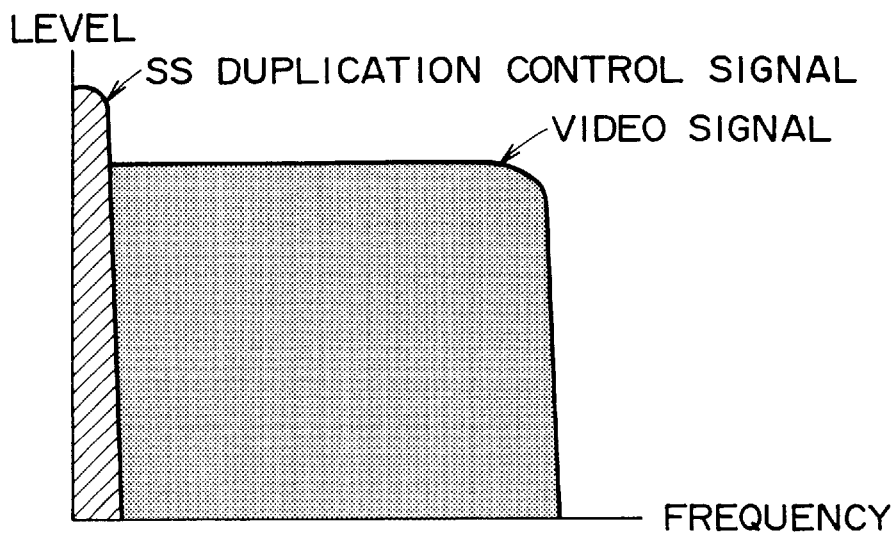

On the other hand, in order to detect the SS duplication control signal on the side of the recording device, applying the reverse spectrum spreading as described later will restore the narrow band SS duplication control signal, as shown in FIG. 7D. To apply a sufficient band spreading rate will make the level of the duplication control signal after the reverse spectrum spreading being applied surpass the level of the main information signal, which enables the duplication control signal to be detected.

Since the SS duplication control signal in this case is superimposed on the analog video signals in an identical time and identical frequency, it is impossible to delete or modify the control signal by using a frequency filter or by a simple replacement of information.

Therefore, the SS duplication control signal superimposed on the video signals is not to be removed, and the SS duplication control signal can reliably be provided to the devices such as the monitor receiver and recording device. Moreover, in this information output device 10, the duplication control signal applying unit 13 superimposes the duplication control signal not to be removed even after being converted into the analog video signals on the SS duplication control signal by a different method from the spectrum spreading. Thus, the method of this embodiment improves the reliability of duplication prevention control in comparison to the duplication prevention control by the SS duplication control signal only.

In the information output device in FIG. 2, after the decoded video signals are converted into analog signals, the D/A converted SS duplication control signal S7, namely, S8 is made to be superimposed on the concerned analog video signals. However, after the digital signal from the duplication control signal applying unit 13 and the digital SS duplication control signal S7 from the SS duplication control signal generator 17 may be added by a digital adder, and the added output may be converted into an analog signal by a D/A converter to thereby acquire the analog video signal S9 on which the SS duplication control signal is superimposed.

Further, the timing generator 19 is designed to extract the synchronizing signal from the analog video signals supplied by the D/A converter 14 to thereby produce various timing signals. However, the timing signals can be generated using the output signal from the decode unit 12 or using the output signal from the duplication control signal applying unit 13.

Next, a recording device will be described which receives an output signal from the foregoing information output device 10 and records the information.

FIG. 8 is a block diagram showing a construction of a recording device 20 which is used in the information duplication control system in this embodiment. The recording device 20 corresponds to the recording system of the DVD device in the first embodiment.

As shown in FIG. 8, the recording device 20 in this embodiment is provided with an A/D converter 21, coding unit 22, writing unit 23, duplication control signal detector 24, SS duplication control signal detector 25, timing generator 26, and duplication control unit 27 for controlling the permission/prohibition of duplication. And, a disk 200 is a DVD on which video signals are written by the recording device 20.

The analog video signal S9 supplied to this recording device 20 from the information output device 10 is converted into a digital video signal S21 by the A/D converter 21, and the digital video signal S21 is supplied to the coding unit 22, writing unit 23, duplication control signal detector 24, SS duplication control signal detector 25, and timing generator 26.

The coding unit 22, while receiving the digital video signal S21 and executing a coding processing such as eliminating the picture synchronizing signal and applying data compression to the digital video signals, makes a digital video signal S22 for recording and supplies the digital video signal S22 to the writing unit 23.

In this example, the duplication control signal detector 24 extracts the duplication control signal interpolated into the vertical blanking period of the video signal, and decodes it. And the duplication control signal detector 24 executes the data judgment as to the contents of duplication control indicated by the concerned duplication control signal, and supplies a judgment result S24 to the duplication control unit 27. In this case, the judgment result S24 is an allowable duplication frequency.

The SS duplication control signal detector 25 possesses a function as a reverse spectrum spreading means that extracts the duplication control signal superimposed on the digital video signal S21 by applying a reverse spectrum spreading. As described later, the start timing of generating a PN code sequence for use in the reverse spectrum spreading is controlled by the reset signal of the timing signals supplied by the timing generator 26.

As described above, in the information output device 10, the PN code sequence PS is generated on the basis of the reset signal RE that is synchronized with the vertical synchronizing signal of the video signals and uses one vertical period as one cycle. Applying this PN code sequence PS to the duplication control signal sequence generates the spread spectrum signal.

Accordingly, also in the recording device 20, the PN code sequence for use in the reverse spectrum spreading is generated for each one vertical period, on the basis of the vertical synchronizing signal of the video signals supplied by the information output device 10; and thereby, the PN code sequence for the reverse spectrum spreading having the same timing as the PN code sequence PS for the spectrum spreading can easily be generated.

The timing generator 26 of the recording device 20 in this example contains the same construction as shown in FIG. 3, generates a reset signal RE1 that controls the start timing of generating a clock signal CLK1 and the PN code sequence for the reverse spectrum spreading on the basis of the vertical synchronizing signal of the input signal S9 of the recording device 20, and supplies the reset signal RE1 to the SS duplication control signal detector 25.

In this case, the reset signal RE1 obtained from the timing generator 26 is a signal corresponding to the reset signal RE used in the SS duplication control signal generator 17 of the information output device 10, and is a vertical synchronizing signal. Therefore, the reset signal RE1 obtained from the timing generator 26 is a signal synchronizing with the reset signal RE, and can be served as a signal for generating the PN code sequence for the reverse spectrum spreading from the top thereof. Accordingly, the SS duplication control signal detector 25 does not require the phase control of the PN code for the reverse spectrum spreading that employs the sliding correlator and the like, as different from the case with a general spectrum spreading that does not contain a synchronizing timing.

The SS duplication control signal detector 25 in this example, which is not illustrated, contains a reverse spectrum spreading unit for extracting the spread spectrum duplication control signal from the supplied digital signal S21 and a data judgment unit for restoring the duplication control signal extracted by this reverse spectrum spreading unit to an original duplication control signal.

The reverse spectrum spreading unit is provided with a PN code generator for the reverse spectrum spreading and a multiplying circuit, and generates a PN code sequence of the vertical cycle. And, the reverse spectrum spreading unit executes the reverse spectrum spreading by using the generated PN code sequence, restores the duplication control signal transformed into the wide band and low level signal to the original narrow band and high level signal to extract the duplication control signal from the signal S21. As to the extracted duplication control signal, the data judgment unit judges the contents of the duplication control that the concerned duplication control signal indicates, and supplies the judgment result S25 to the duplication control unit 27. In this case, the judgment result S25 indicates the allowable duplication frequency.

The duplication control unit 27 forms a control signal S27 for controlling the writing unit 23 on the basis of the judgment result S24 and S25, and supplies the control signal S27 to the writing unit 23. The control signal S27 is to control the permission or prohibition of writing the video signal in the disk 200. When the control signal S27 indicates the permission of writing, the duplication control unit 27 controls to update the duplication control signal.

The writing unit 23 writes the digital video signal S22 from the coding unit 22 in the disk 200, when the control signal S27 from the duplication control unit 27 indicates the permission of duplication, and at the same time updates the content of the duplication control signal to record it as an additional information. The update of the content is to reduce the allowable frequency of duplication. When the control signal S27 indicates the prohibition of duplication, the writing unit 23 is controlled not to write the digital signal S22 in the disk 200.

The judgment result S24 from the duplication control signal detector 24 and the judgment result S25 from the SS duplication control signal detector 25 ought to be originally the same. However, in the process to the input of the recording device, if either of the duplication control signals is removed or modified, the judgment result S24 and the judgment result S25 will not be the same. The duplication control unit 27 regulates such inconsistency, and properly maintains the duplication control.

FIG. 9 is a flow chart of the processing in the duplication control unit 27.

First, at step 301, the duplication control unit 27 acquires the judgment results of the duplication control information superimposed by plural different methods. Next, at step 302, the duplication control unit 27 detects the minimum value K of the allowable frequency out of the plural judgment results. And, if the minimum value K is 0, at step 305, the duplication control unit 27 prohibits the writing unit 23 to write the digital data in the disk 200.

If the judgment result at step 302 indicates that the minimum value K is 1 or more, the duplication control unit 27 allows the writing unit 23 to write the digital data in the disk 200 at step 303, and modifies the content of the duplication control signal to reduce the allowable duplication frequency by one time at step 304; further, the duplication control unit 27 controls the writing unit 23 to write the additional data of the duplication control signal that the duplication allowable frequency is reduced by one time as well as the digital data in the disk at step 306.

The recording method of the duplication control signal, as described above, may record the duplication control signal by interpolating it into the picture data with areas divided, or by applying the spectrum spreading to it. Further, naturally the method may record the concerned updated duplication control signal by plural different methods in the same manner as above.

In the recording device 20 in. FIG. 8, the input signal S9 is converted into a digital signal by the A/D converter 21, and thereafter the input signal S9 is made to be supplied to the SS duplication control signal detector 25. However, the SS duplication control signal can be detected also from the analog signal S9. Further, the timing generator 26 can extract the synchronizing signal from the analog signal S9 to thereby generate various timing signals such as the, clock signal and reset signal.

[Second Embodiment]

In the foregoing embodiment, the duplication control signal is transformed into a spread spectrum signal, which is superimposed on an analog information signal, and at the same time the duplication control signal being a digital data is superimposed thereon. However, in this second embodiment, the duplication control signal is superimposed in plural kinds by using the spectrum spreading method.

Figure 10:
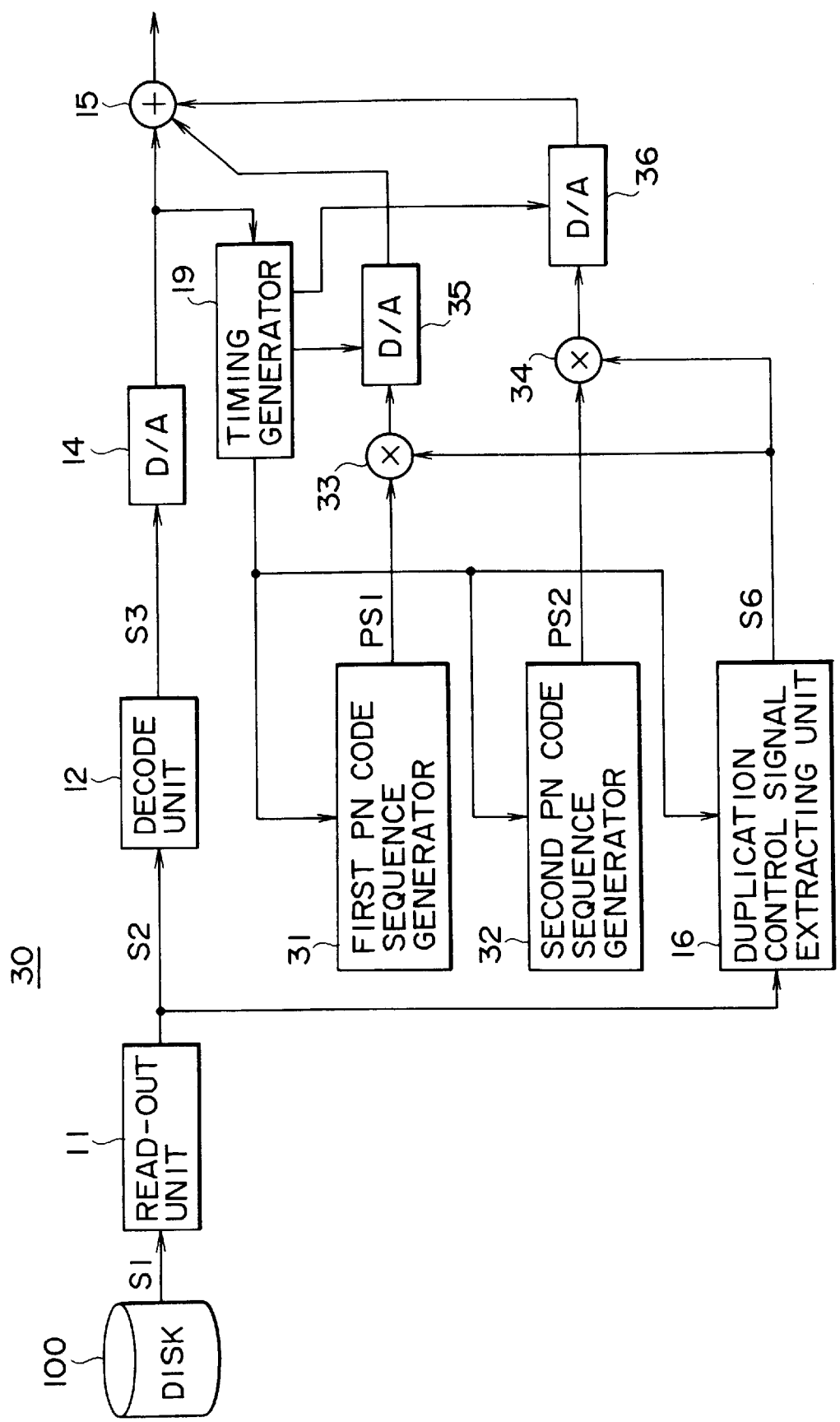
FIG. 10 is a block diagram for explaining another embodiment of the information output device according to the present invention.

FIG. 10 illustrates an information output device 30 of the second embodiment.

The signal processing in the second embodiment that a read-out unit 11 reads out a digital data S2 from a disk 100 and a duplication control signal extracting unit 16 extracts a duplication control signal S6 from the digital data S2 is the same as the information output device 100 in the first embodiment. However, in this embodiment, the extracted duplication control signal S6 is supplied to multipliers 33, 34 for a first and second spectrum spreads.

The multiplier 33 is provided with a first PN code sequence PS1 from a first PN code sequence generator 31, and the multiplier 34 is provided with a second PN code sequence PS2 from a second PN code sequence generator 32 that generates a PN code sequence different from the foregoing first PN code sequence PS1. Therefore, the multiplier 33 multiplies the duplication control signal S6 by the first PN code sequence PS1 into a spread spectrum signal, and the multiplier 34 multiplies the duplication control signal S6 by the second PN code sequence PS2 into another spread spectrum signal; thus the multiplier 33 and 34 produce different spread spectrum signals.

These SS duplication control signals each are converted into analog signals each by D/A converters 35 and 36, and thereafter both of the foregoing analog signals are supplied to an adder 15 where both of the signals are superimposed on analog video signals from a D/A converter 14, which is outputted to the recording device. In this example, the duplication control signal applying unit 13 in the first embodiment is not needed. However, providing the foregoing applying unit 13 will make a superimposition method of three kinds of duplication control signals.

In this example, in the same manner as the foregoing first embodiment, the first PN code sequence PS1 and the second PN code sequence PS2 each are designed to be PN codes using one vertical period as the repetitive cycle, synchronized with the vertical synchronizing signal by a timing signal from a timing generator 19. Therefore, it is easy to acquire a PN code for the reverse spectrum spreading only by generating a reset signal synchronized with the vertical synchronizing signal when applying the reverse spectrum spreading.

Figure 11:
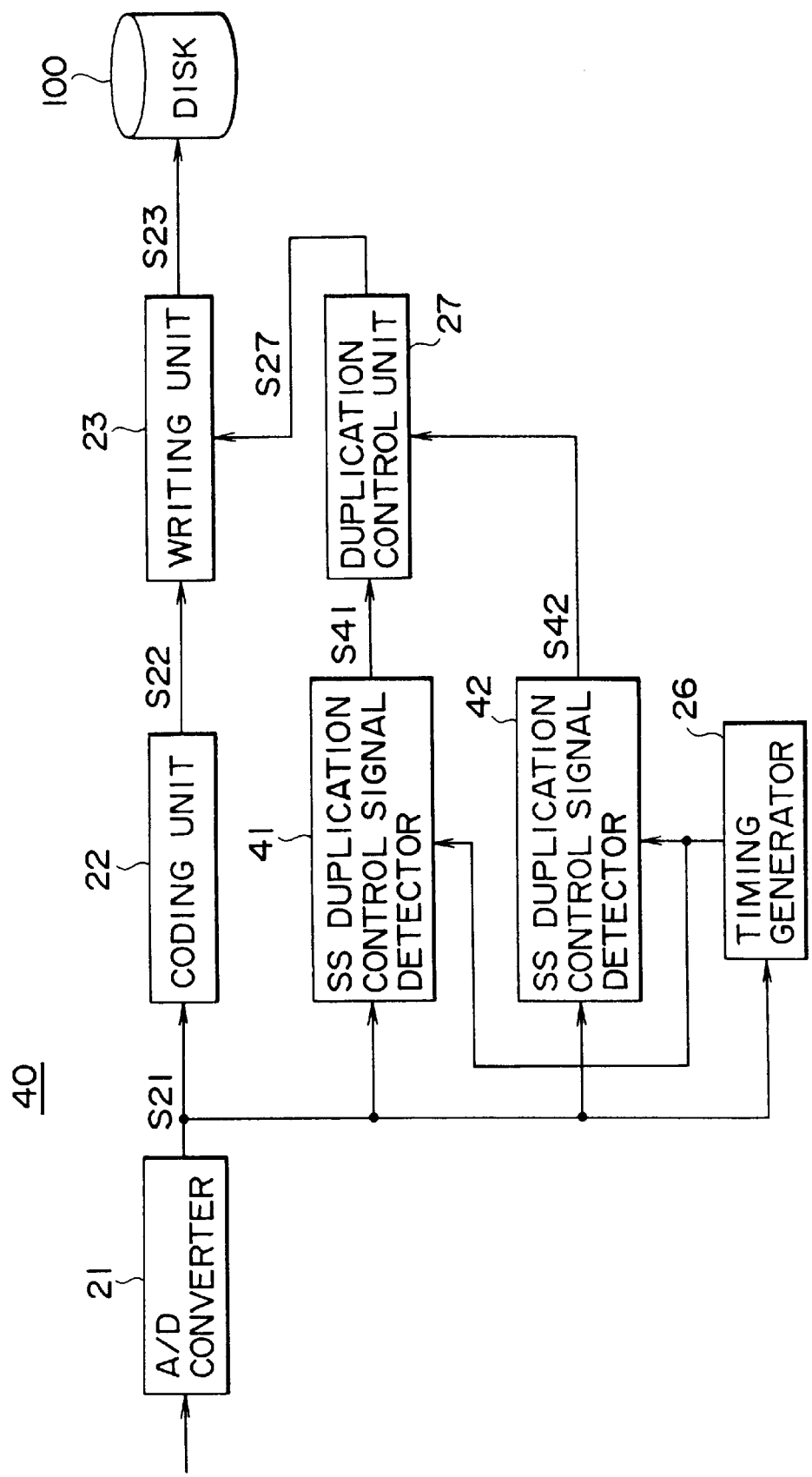
FIG. 11 is a block diagram for explaining another embodiment of the recording device according to the present invention.

FIG. 11 illustrates an example of a recording device 40 that receives a signal from the information output device 30 and executes the duplication control.

In this example, the recording device 40 is provided with SS duplication control signal detectors 41 and 42, and a timing signal from a timing generator 26 is supplied to both of the SS duplication control signal detectors 41 and 42.

The SS duplication control signal detectors 41 and 42 each contain PN code generators similar to the first PN code sequence generator 31 and the second PN code sequence generator 32 in the information output device 30. And, the timing signal synchronized with the vertical synchronizing signal from the timing generator 26 initializes these PN code generators to generate PN code sequences having the same level as the first PN code sequence PS1 and the second PN code sequence PS2, having the same phase when the spectrum spreading being applied. By these PN code sequences, the reverse spectrum spreads are applied to restore the duplication control signals and to judge data. Data judgment results S41 and S42 are supplied to a duplication control unit 27.

In the same manner as in the foregoing first embodiment, the duplication control unit 27 performs a consistency processing as to the judgment results S41 and S42, and appropriately controls a writing unit 23 to or not to write, in the completely same manner as the foregoing.

In stead of using the different sequences of PN codes as above, one kind of PN code is made to generate PN codes having different phases, which may be used in the same manner. Further, in the foregoing first and second embodiments, the PN code of M sequence is used. However the PN code is not limited to the M sequence, and the Gold code sequence or other various codes can be used for the spectrum spreading.

Further, the PN code sequences for the spectrum spreading and reverse spectrum spreading are generated for each one vertical period, which, however, may be generated for every plural vertical periods such as for every two vertical periods or for every four vertical periods; or it may be generated for every divided periods made by dividing one vertical period into plural numbers, such as for every 1/2 vertical periods or for every 1/4 vertical periods.

Further, the picture synchronizing signal is not limited to the vertical synchronizing signal, and the horizontal synchronizing signal may be used. Also in this case, the PN code sequences for the spectrum spreading and the reverse spectrum spreading may be generated for every plural horizontal periods, or for every divided periods made by dividing one horizontal period into plural numbers.

Further, the examples mentioned above relate to the case that the information signal is assumed to be video signals. However, the invention can be applied to audio signals, or every possible information that a duplication prevention control is required.

Further, when the information signal is not video signals, providing a synchronizing signal of a specific timing and generating a PN code to synchronize with the timing synchronizing signal will facilitate the detection of the PN code when the reverse spectrum spreading is applied, in the same manner as above. However, it is not necessarily required to provide the synchronizing signal to generate the PN code. Naturally, such a method as the sliding correlation may be employed in the reverse spectrum spreading in the same manner as the usual method, whereby the phase control is carried out to apply the reverse spectrum spreading.

Further, in the foregoing examples, the writing unit is made to record video signals in the digital format on the disk; however, naturally the invention is applicable when the writing unit records video signals in the analog format. In that case, preferably the writing unit 23 applies the spectrum spreading to the updated duplication control signal as described above, superimposes the spread spectrum duplication control signals on the analog video signals to record, and superimposes the similarly updated duplication control signal by the other analog superimposition method on the analog video signals to record.

When a plurality of duplication control signals are recorded on the recording medium in this manner, even when the signals are reproduced by a usual reproducing device in stead of the foregoing information output device 10, the spread spectrum duplication control signal as well as the duplication control signal by the other method are transmitted to the recording device 20; and therefore, a proper duplication control can be performed in this recording device 20, in the same manner as above.

Further, in the above description, the information output device is assumed to handle a recording medium on which a predetermined duplication control information is recorded in the digital format. However, the invention is applicable also to an information output device that outputs information by reproducing a recording medium having analog information recorded on, in which a passive duplication prevention measure is taken by the foregoing AGC or APC system.

The information output device in this case is provided with a generator of the duplication control signal, and when detecting a large amplitude pseudo synchronizing signal for the foregoing AGC system, the information output device generates the duplication control signal from the generator, applies the spectrum spreading to the duplication control signal, and superimposes the spread spectrum duplication control signal on the analog output information signal to output. Thereby, even when a recording medium does not contain the duplication control signal, the duplication prevention control can reliably be carried out.

In the same manner, in an information output device that reproduces a recording medium on which an information is recorded in the digital format and an information for a direct duplication control is not recorded while a copyright information is recorded as an additional information, when performing reproduction and the foregoing copyright information as an additional information is detected, the information output device generates a duplication control signal, applies the spectrum spreading to the duplication control signal to produce a spread spectrum duplication control signal as described above, superimposes the spread spectrum duplication control signal on the analog output information signal to output. Thereby, in the analog connection, the duplication prevention control in the recording device can reliably be carried out.

Further, in the foregoing examples, the duplication control signals are superimposed double, however naturally, the duplication control signals may be superimposed in triple or more.

Still more, it is natural that the contents of the duplication control signal may indicate not the allowable duplication frequency, but duplication permission, duplication prohibition, and generation limitation such as the duplication permission only for the first generation.

In the invention thus described, the duplication control information is superimposed on the main information signal by plural superimposition methods. Therefore, even though the duplication control information by one or some of the methods is removed or modified, if at least one duplication control signal remains, the duplication prevention control is reliably carried out. Especially in the invention, one of the plural superimposition methods applies the spectrum spreading to the duplication control signal to widen the frequency band and superimpose the spread spectrum duplication control signal on the analog information signal in the same time and same frequency as those of the analog signal. Therefore, it will be impossible to delete or modify the duplication control information by using a frequency filter or a simple replacement of an information signal. Thus, an effective duplication prevention control can be carried out in the analog connection.

And, when any of the plural duplication control signals is modified and there occurs an inconsistency between the plural duplication control signals, since the duplication control signal closest to duplication prohibition is applied for the consistency processing as a rule, the duplication prevention control is properly carried out.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for adding a duplication control information signal to a main information signal, comprising:
    first adding means for adding said duplication control information signal to said main information signal by processing a first processing to said duplication control information signal which indicates a number of allowable duplications of a main information signal;
    second adding means for adding said duplication control information signal to said main information signal by processing a second processing different from said first processing to said duplication control information signal which indicates a number of allowable duplications of a main information signal; and
    output means for outputting said main information signal containing said first and second processed duplication control information signals.

2. The device as claimed in claim 1, wherein
    said first process is a process using first codes; and
    said second process is a process using second codes different from said first codes.

3. The device as claimed in claim 1, wherein
    said first process is a process for spreading spectrum of said duplication control information signal using first codes; and
    said second process is a process for spreading spectrum of said duplication control information signal using second codes different from said first codes.

4. The device as claimed in claim 1, wherein
    said first process is a process using first codes; and
    said second process is a process using second codes having different phase from said first codes.

5. The device as claimed in claim 1, wherein
    said first process is a process using first codes; and
    said second process is a process using second codes having different sequence from said first codes.

6. The device as claimed in claim 1, wherein
    said first process and said second process are different in using codes having different sequences.

7. The device as claimed in claim 1, wherein said first process and said second process are different in using codes having different phases.

8. The device as claimed in claim 1, wherein said first process is a process for spreading spectrum of said duplication control information signal using said first codes and for superimposing said duplication control information signal of which the spectrum is spread; and said second process is a process for adding said duplication control information signal in a blanking period of said main information signal.

9. A device for detecting first and second duplication control information signals included in an input signal, said device comprising:

first detecting means for detecting said first duplication control information signal by processing a first process to said input signal;

second detecting means for detecting said second duplication control information signal from said input signal by processing a second process different from said first process to said input signal;

determining means for determining a duplication control based on one of said first and said second detected duplication control information signals that indicates a state closer to prohibiting duplication; and output means for controlling outputting of said input information signal.

10. The device as claimed in claim 9, wherein said first process is a process using first codes; and said second process is a process using second codes different from said first codes.

11. The device as claimed in claim 9, wherein said first process is a process for inverse spreading a spectrum of said first duplication control information signal superimposed on said input signal using first codes; and said second process is a process for inverse spreading a spectrum of said second duplication control information signal superimposed on said input signal using second codes different from said first codes.

12. The device as claimed in claim 9, wherein said first process is a process using first codes; and said second process is a process using second codes having different phases from said first codes.

13. The device as claimed in claim 9, wherein said first process is a process using first codes; and said second process is a process using second codes having different sequences from said first codes.

14. The device as claimed in claim 9, wherein said first process and said second process are different in using codes having different sequences.

15. The device as claimed in claim 9, wherein said first process and said second process are different in using codes having different phases.

16. The device as claimed in claim 9, wherein said first process is a process for inverse spreading a spectrum of said first duplication control information signal superimposed on said input signal using said first codes; and said second process is a process for extracting said duplication control information signal from a blanking period of said input signal.

17. The device as claimed in claim 9, wherein said output means decrements a number of allowable duplications included in one of said first and second duplication control information signals and records said decremented duplication control information signal and said input signal on a recording medium.

18. A method for adding a duplication control information signal to a main information signal comprising:

adding said duplication control information signal to said main information signal by processing a first processing to said duplication control information signal which indicates a number of allowable duplications of a main information signal;

adding said duplication control information signal to said main information signal by processing a second processing different from said first processing to said duplication control information signal which indicates a number of allowable duplications of a main information signal; and outputting said main information signal containing said first and second processed duplication control information signals.

19. The method as claimed in claim 18, wherein said first process is a process using first codes; and said second process is a process using second codes different from said first codes.

20. The method as claimed in claim 18, wherein said first process is a process for spreading spectrum of said duplication control information signal using first codes; and said second process is a process for spreading spectrum of said duplication control information signal using second codes different from said first codes.

21. The method as claimed in claim 18, wherein said first process is a process using first codes; and said second process is a process using second codes having different phase from said first codes.

22. The method as claimed in claim 18, wherein said first process is a process using first codes; and said second process is a process using second codes having different sequence from said first codes.

23. The method as claimed in claim 18, wherein said first process and said second process are different in using codes having different sequences.

24. The method as claimed in claim 18, wherein said first process and said second process are different in using codes having different phases.

25. The method as claimed in claim 18, wherein said first process is a process for spreading spectrum of said duplication control information signal using said first codes and for superimposing said duplication control information signal of which the spectrum is spread; and said second process is a process for adding said duplication control information signal in a blanking period of said main information signal.

26. A method for detecting first and second duplication control information signals included in an input signal, said method comprising:

detecting said first duplication control information signal by processing a first process to said input signal;

detecting said second duplication control information signal from said input signal by processing a second process different from said first process to said input signal;

determining a duplication control based on a one of said first and the second detected duplication control information signals that indicates a state closer to prohibiting duplication; and outputting of said input information signal.

27. The method as claimed in claim 26, wherein said first process is a process using first codes; and said second process is a process using second codes different from said first codes.

28. The method as claimed in claim 26, wherein said first process is a process for inverse spreading a spectrum of said first duplication control information signal superimposed on said input signal using first codes; and said second process is a process for inverse spreading a spectrum of said second duplication control information signal superimposed on said input signal using second codes different from said first codes.

29. The method as claimed in claim 26, wherein said first process is a process using first codes; and said second process is a process using second codes having different phases from said first codes.

30. The method as claimed in claim 26, wherein said first process is a process using second codes having different sequences from said first codes.

31. The method as claimed in claim 26, wherein said first process and said second process are different in using codes having different sequences.

32. The method as claimed in claim 26, wherein said first process and said second process are different in using codes having different phases.

33. The method as claimed in claim 26, wherein said first process is a process for inverse spreading a spectrum of said first duplication control information signal superimposed on said input signal using said first codes; and said second process is a process for extracting said duplication control information signal from a blanking period of said input signal.

34. The device as claimed in claim 26, wherein said outputting step decrements a number of allowable duplications included in one of said first and second duplication control information signals and records said decremented duplication control information signal and said input signal on a recording medium.

* * * * *